United States Patent [19]

Capella

[11] Patent Number: 4,834,840

[45] Date of Patent: May 30, 1989

[54] HAZARDOUS WASTE MANAGEMENT SOLAR DRYER APPARATUS

[75] Inventor: Joseph A. Capella, Alachua, Fla.

[73] Assignee: Matrix Recovery Systems, Williston, Fla.

[21] Appl. No.: 26,381

[22] Filed: Mar. 16, 1987

[51] Int. Cl.⁴ .......................... B01D 1/00; B01D 5/00
[52] U.S. Cl. .................................. 202/172; 202/176;
  202/189; 202/185.6; 202/202; 202/234;
  202/266; 34/73; 34/93; 159/47.3; 159/903;
  203/DIG. 1; 203/DIG. 25; 210/241
[58] Field of Search ........ 203/100, DIG. 1, DIG. 25;
  202/234, 266, 176, 185.6, 83, 172, 202, 189;
  159/903, 904, 905, 45, 47.3; 34/39, 40, 68, 73,
  79, 93; 210/241

[56] References Cited

U.S. PATENT DOCUMENTS

| | | | |
|---|---|---|---|
| 2,342,062 | 2/1944 | Schenk | 159/903 |
| 2,424,142 | 7/1947 | Bimpson et al. | 202/185.6 |
| 2,843,536 | 7/1958 | Mount | 202/234 |
| 2,975,107 | 3/1961 | Friedman | 203/42 |
| 3,193,473 | 7/1965 | Beard | 202/234 |
| 4,135,985 | 1/1979 | La Rocca | 202/176 |
| 4,159,228 | 6/1979 | Bellande et al. | 202/185 |
| 4,209,363 | 6/1980 | Ramer | 202/180 |
| 4,219,387 | 8/1980 | Gruntmann | 203/DIG. 1 |
| 4,240,210 | 12/1980 | Huang | 34/93 |
| 4,371,623 | 2/1983 | Taylor | 435/290 |
| 4,492,039 | 1/1985 | Chao et al. | 203/DIG. 1 |
| 4,495,034 | 1/1985 | Lucas | 202/181 |

FOREIGN PATENT DOCUMENTS

| | | | |
|---|---|---|---|
| 2834667 | 2/1980 | Fed. Rep. of Germany | 159/903 |
| 701948 | 12/1979 | U.S.S.R. | 203/DIG. 1 |
| 12402 | 2/1889 | United Kingdom | 159/903 |

Primary Examiner—Wilbur Bascomb
Attorney, Agent, or Firm—Dowell & Dowell

[57] ABSTRACT

Processes for managing toxic and hazardous waste materials containing distillable solvents or chemicals in which the waste materials are collected and introduced into solar dryers wherein the more volatile solvent or chemical components thereof are distilled and recaptured as pure byproducts which may be recycled for future use and wherein the residue is retained within the solar dryers until such time as the residue is substantially free of all of the contaminant solvents or chemicals and after which such residue may be removed as a non-toxic and non-hazardous byproduct which may be prepared for future use or disposed of in a conventional manner. The waste management processes are made possible through the use of solar drying devices which include one or more solar drying units, each of which includes a drying tray wherein the volatile and toxic components of the waste material are driven off through radiant energy generated by the sun and through temperature differentials established between the tray and the glass covers therefore during periods of no sun with the distillate byproducts being captured and collected for future use.

12 Claims, 3 Drawing Sheets

HAZARDOUS WASTE MANAGEMENT SOLAR DRYER APPARATUS

BACKGROUND OF THE INVENTION

1. Field of the Invention

This invention is generally directed to distillation equipment which utilizes solar energy to separate the chemical components of an original product and more specifically to a process of waste control management wherein solar energy is utilized to obtain non-hazardous byproducts from contaminated waste materials by retaining such materials in solar drying units wherein the materials may be exposed over long periods of time to elevated temperatures caused by the sun's radiation so as to effectively drive substantially all of the hazardous and more volatile components from the material and reclaiming such components in a purified state as liquid distillates which can be thereafter reused in an industrial capacity. Also, the residue remaining within the solar dryers are substantially free of contaminants and therefore can be classified and handled as non-toxic byproducts which may be reworked for future industrial use or disposed of in conventional disposal sites. The process and apparatus have particular use in various industries such as wherein acetone is utilized in a manufacturing process in combination with binders, fiberglass and other fillers. The hazardous waste materials from such processes, including the acetone, can be treated with the acetone being purified and recaptured for commercial use. The residue of the waste material is also capable of being reworked as a non-hazardous product with potential uses and as binder resin material. The process of the present invention can be practiced without the requirement for the input of any electrical or other outside sources of energy other than that naturally occurring from the sun.

The processes and apparatus of the present invention thereby make it possible to eliminate the need for costly and environmentally hazardous waste disposal sites to be established for handling toxic wastes by enabling such wastes to be separated by distillation and drying and subsequently recycled for industrial uses without leaving any residual toxic wastes.

In one form of the invention, the solar drying apparatus are mounted within concrete containment supports which are designed to allow flow by gravity through a plurality of solar drying units or chambers so that any contaminated liquids which are pumpable may be passed through the system and introduced to the drying units with the purified distillates being discharged therefrom in a manner which requires no electrical input to maintain a flow through the system thereby further reducing costs of recycling the various components of the hazardous waste materials.

2. History of the Art

There is an evergrowing awareness not only in the United States but in other countries of the effect that chemical dumping is having upon the environment not only locally but generally. Ground water supplies are increasingly becoming contaminated through the dumping of chemicals used in manufacturing, chemical processing, oil spills, gasoline leaks and from improper chemical handling and the like. Many such hazardous chemicals are introduced involuntarily into the ground and after a period of time begin to contaminate the local water supply. After prolonged periods of time, the pollutants are spread over larger areas as hazardous chemicals are carried by subsurface waters to other areas. In addition to the foregoing, it is common practice even though illegal for many manufacturers to discharge chemical waste byproducts of manufacturing processing by illegal burial or dumping activities. Such activities have led to contamination of local land sites, local water sources and larger areas such as rivers, bays and even ocean water.

In more recent years, governments have begun regulating the disposal of various types of hazardous or contaminated waste materials. However, with regulation comes the necessity for enforcement and such enforcement is often difficult especially when trying to regulate the disposal of the lower level chemical toxins which are frequently used in a plurality of industries. Such chemicals include various solvents, oils and other products including acetones, methylene chlorides, trichloro-ethanes, halogenated hydrocarbons such as known by the trademark FREON, and the like.

Until recently, many of the foregoing chemicals were simply disposed of by dumping or by allowing liquid components to evaporate and thereafter discharging or dumping of the sludge material which remained. Newly enacted regulations, however, are requiring that manufacturers account for the handling and disposal of such manufacturing wastes. In an effort to meet government regulations and to preserve the environment, many manufacturers have had to result to processing chemical waste in an effort to reduce the amount of waste material and then have had to utilize special waste disposal sites for the disposal of the residual hazardous materials left from such processing. Such toxic waste management handling has proven to be economically burdensome and in the long run wasteful of products and materials.

Currently, there are several types of commercially available processes for recovering solvents. Such processes involve the use of thin film evaporators or electrical batch processing stills. In a commercial batch processing system, energy is supplied to a batch of waste material and the volatile components are boiled off until such time as a residual sludge remains within the processing still. Thereafter, the material is removed from the still and prepared for an appropriate disposal. It should be noted that the waste material which remains as sludge is considered hazardous and toxic waste and must be handled as such, and therefore, the eventual costly storage or burial of the sludge waste material is not eliminated.

In thin film type evaporators, the toxic material is sprayed in the middle of a jacketed tube which is heated by steam. As vapor comes off, residue remains on the walls of the unit where it is scraped from the walls as a residue. The remaining residue like that of the batch processing stills remains classified as a toxic or hazardous waste material and again must be handled in accordance with government regulations for the disposal of hazardous wastes.

It is commercially not profitable to utilize conventional solvent recycling or recovery processes due to the fact that there remains a waste residue which must be handled as a hazardous material. Any efforts to further distill the volatile components within conventional processing units would require enormous inputs of energy which are overly costly and not practical. In essence, energy input into an electric or steam distillation process is not effective if it is desired that all the solvent be driven from the residue. Such systems may be practical when removing approximately 90% of the solvent, however, the energy to remove the remaining 10% would require two to three times additional energy input and thus are cost prohibitive.

The use of solar energy in distilling various chemical components is well known. Utilizing the sun's energy, it is possible to drive one volatile component from a less volatile component and thereby separate materials into two separate constituents or byproducts. Such uses are currently being made of solar stills in the recapture of fresh water by the distillation of salt water. There has not been, however, any suggested use of solar energy for eliminating the hazards of chemical waste disposal. Further, it has not been proposed to utilize the sun's energy in a process whereby hazardous waste material is not only separated through solar energy but where the solar energy is used to dry portions of the materials to a point where the residues which remain are no longer considered as hazardous wastes. Therefore, it has not been recognized that solar energy can be used to enable potentially hazardous wastes to be handled and recycled without waste and without the need for additional hazardous waste handling, treatment or storage.

Some examples of prior art solar distilling equipment are disclosed in U.S. Pat. Nos. 2,342,062 to Schenk; 2,424,142 to Bimpson et al.; 2,975,107 to Friedman; 4,135,985 to La Rocca; 4,159,228 to Bellande; 4,209,363 to Ramer; 4,371,623 to Taylor and 4,495,034 to Lucas. Only the reference to Lucas is concerned with the treatment of waste effluents to recover solvent.

SUMMARY OF THE INVENTION

This invention is directed to a process for waste disposal management wherein solar dryers are utilized to convert toxic and hazardous chemical waste from commercial manufacturing into recycled products and byproducts without leaving any residual contaminated material which must be subsequently handled as a toxic waste. The process involves subjecting chemical sludges and waste having a predominant hazardous chemical component which may be separated at different evaporative temperatures between 0° and 100° C. by retention of the waste material within solar drying trays wherein the material is subjected to both direct and indirect radiant energy to thereby separate the chemical components by a distillation process wherein the toxic liquid distillate is recaptured and channelled and caused to flow by gravity to awaiting storage receptacles. The process involves retaining the waste material within the solar dryers until such time as the residual non-distilled material therein is classifyable as a non-toxic waste and therefore not hazardous to local water supplies or ground areas in the event that such material were to be disposed of in conventional landfills. During the process, the residue in the solar dryers will dry to a hardened state after which it is removed from the dryers and further processed such as by grinding. Thereafter, the processed residue can be recycled to industry as resin filler which may be utilized in various plastics and fiberglassing manufacturing industries.

According to one aspect of the invention, the solar dryers include at least a single tray having a removable glass cover which may be locked in airtight sealed engagement with the tray. The tray is designed to hold a specific quantity of contaminated liquid and sludge materials wherein such materials are exposed to direct and, in some cases, indirect radiation from the sun. The tray is designed to retain heat by absorption so that the unit will continue to separate solvents after periods when the sun is not available due to temperature differentials created between the tray and the glass cover. Water cooled condensing coils are also mounted within each tray. Collection troughs are provided for channelling the distillate which is obtained either directly through cooling coils or indirectly from the glass cover of the tray into storage receptacles which are located at a point below or downstream of the drying tray so that the flow of purified solvent from the tray is by gravity.

In commercially available units, the trays are designed to be installed in in-line relationship upon concrete containment barriers which are oriented along a sloped surface so that the passage of chemicals through a series of trays is by gravity between a waste supply source and a clean solvent storage container. The containment facilites are designed with a generally U-shaped cross section so that any material spills will be retained therein and channeled to one end thereof for subsequent recapture. In this manner, the containment barriers will house the components of the various dryers or units within enclosed areas so that the chance of any accident or chemical spill is significantly reduced. Additional treatment capacity may be achieved by adding additional units along a given line of such drying trays.

According to another aspect of the invention, each solar dryer may be associated with one or more reflectors which will be utilized to direct increased amounts of the sun's energy into the drying trays. Such reflectors may be in the form of adjustable mirrors installed adjacent each tray.

It is a primary object of this invention to provide a method of managing and handling toxic and hazardous wastes which result from the use of solvents and other chemicals in manufacturing processes or other sources wherein such wastes are placed in solar dryers and allowed to remain until substantially all of the solvents or hazardous chemicals have been removed therefrom so as to result in a residue of dry byproducts which are classifyable as a non-hazardous waste material.

It is another object of the present invention to provide a process for treating toxic waste materials which will also reduce manufacturing costs wherein toxic and hazardous chemicals which are adverse to the environment are distilled and recaptured by a drying process wherein solar energy is utilized to separate such chemicals for recycling substantially purified products.

It is another object of the present invention to provide a process for handling waste materials which are toxic and hazardous to the environment in such a manner that the materials may be separated as purified components ready for commercial use without leaving byproducts which must be handled as hazardous or toxic waste materials.

It is a further object of the invention to provide a process wherein toxic and hazardous waste materials may be processed utilizing solar energy so as to obtain recyclable and reusable chemicals and wherein any dry residual products are in a purified non-toxic state so that they may be either disposed of in conventional landfills without fear of environmental contamination or processed for further use by industry.

It is also an object of the present invention to provide a solar dryer which may be utilized to treat and separate volatile components from toxic wastes wherein the solar dryer operates without commercial energy consumption.

It is yet another object of the present invention to provide a solar dryer system which may be easily expanded so as to enable additional quantities of waste materials to be treated in an in-line operation without requiring massive changes in the structural integrity of existing dryer units.

Another object of the present invention is to provide drying apparatus for treating and recovering useable products from contaminated wastes wherein the dryers are mounted in containment facilities which align individual dryer trays to be in a gravity flow relationship with respect to one another and which provides a containment area in which any spilled waste or purified chemical material will be secured in the event of accident.

Another object of the present invention is to provide a low cost and effective process for converting hazardous and toxic waste materials into recycled, purified and reusable products for future use in such a manner that substantially no waste remains.

A further object of the present invention is to provide a solar dryer which can be utilized by even the smallest of manufacturers in a cost effective manner to dry toxic sludge and waste materials so that the solvents or toxic components of the waste material may be recovered in a purified state for future manufacturing processing or use and wherein the residue may be either selectively discharged or prepared for further commercial usage as a non-toxic material.

It is also an object of the present invention to provide a solar drying apparatus which may be utilized to treat numerous types of manufacturing wastes which are classified as toxic and hazardous and especially with respect to such products as acetone which is used as a cleaner, thinner or additive wherein the acetone may be recaptured by a solar drying process as a purified liquid which may be reused in a purified state and with the residual material from the waste being capable of being recycled as filler for use in the fiberglass and plastics industries.

DESCRIPTION OF THE PREFERRED EMBODIMENT

With continued reference to the drawings, the methods and apparatus of the present invention will be described in greater detail. A simplified embodiment of the present invention is disclosed in FIGS. 1 and 2 and is designed for use in small manufacturing plants wherein toxic or hazardous waste materials are present in only small amounts. FIGS. 3–6 disclose a preferred embodiment of the invention wherein a plurality of solar drying units are connected in line so as to enable large commercial quantities of toxic or hazardous waste materials to be treated in a substantially continuous process.

Figure 1:
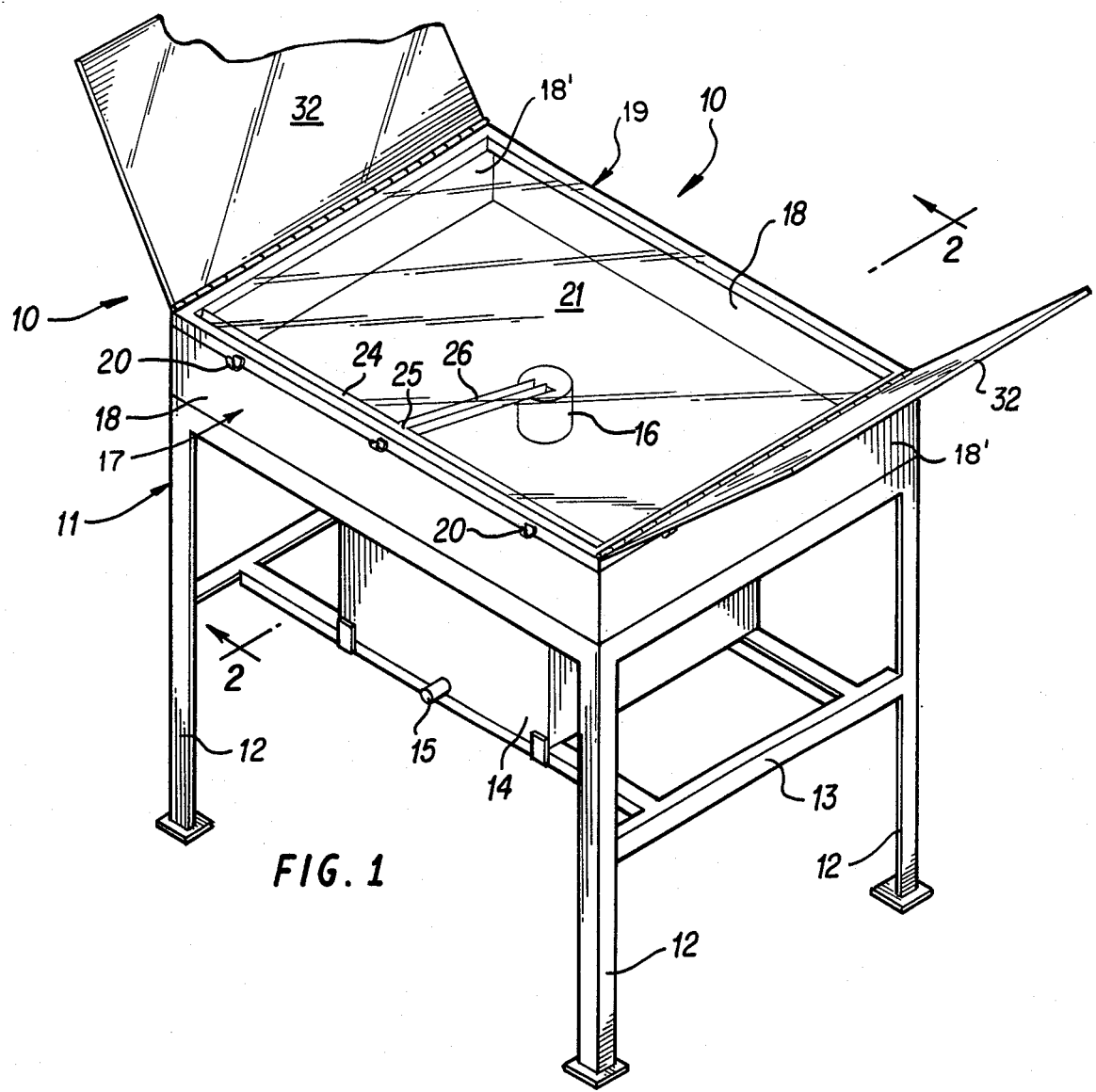
FIG. 1 is a perspective view of a single solar dryer as utilized as an independent unit for the treatment of hazardous waste materials.
Figure 2:
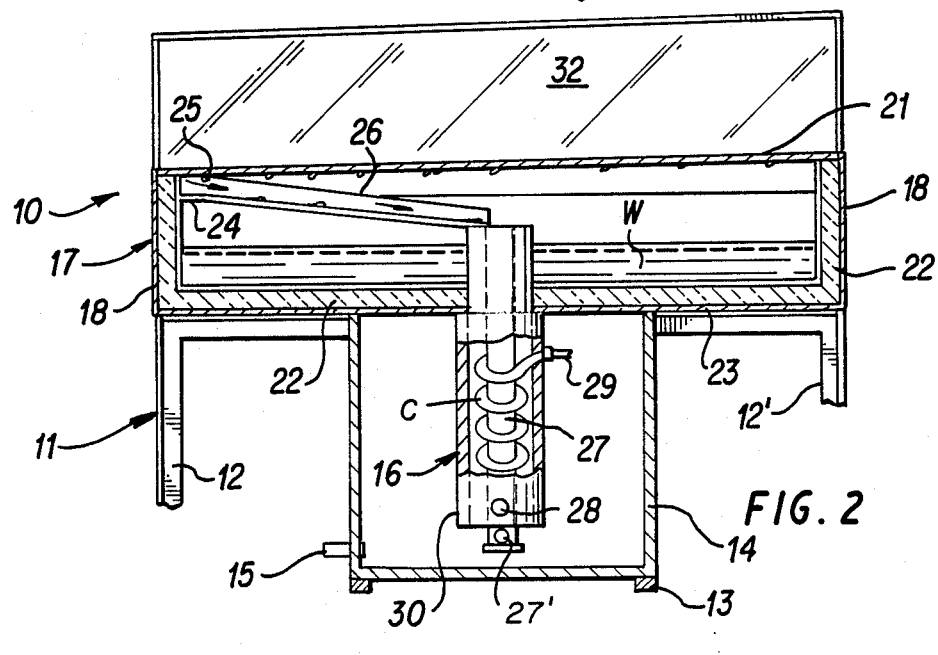
FIG. 2 is a partial cross sectional view taken across lines 2—2 of FIG. 1.

With specific reference to FIGS. 1 and 2, a solar dryer 10 embodying the features of the present invention is shown as being mounted on a stand 11 having a plurality of supporting legs 12 which are reinforced by an intermediate frame 13 which is connected therebetween. A pure solvent or chemical collection receptacle 14 is mounted on the reinforcing frame 13 and includes a discharge or outlet valve 15. The solvent collection receptacle 14 is mounted beneath the solar dryer and is in fluid communication therewith through a collection and condensing apparatus or unit 16 which extends through the central portion of the dryer tray 17. The dryer tray 17 is shown as being generally rectangular in configuration having elongated side walls 18 and end walls 18'. Cooperatively seated along the upper edges of the side and end walls of the tray is a covering frame 19 which is retained in airtight relationship with the side walls by a plurality of latches 20. A suitable gasket is disposed between the frame 19 and the upper edges of the walls so as to insure that no air passes therethrough when the frame is in place. A glass cover 21 is mounted in sealed relationship within the frame 19 and provides both the cover and the distillate collection plate for the dryer unit.

The solar dryer tray is constructed having inner and outer wall elements having a styrofoam insulation layer 22 formed therebetween. In some instances, it may be preferred to coat the interior of the walls and the bottom 23 of the trays with a heat absorbing material such as black paint or other similar coating.

Mounted adjacent one of the elongated side walls 18 is an open trough 24 which extends along the entire length of the dryer tray. The trough is generally U-shaped in cross section being only open at the top with the exception of a drain opening 25 which communicates with a discharge channel 26. The channel 26 extends from the collection trough 24 to the center of the condensing apparatus 16. Liquid condensate which is collected by the trough 24 is directed through the channel 26 to a collection pipe 27 which extends through the condenser unit 16 and which includes an opening 27' at its lower end so that the condensate will pass into the collection receptacle 14. The condenser unit 16 is provided with a water cooling coil C having an inlet 28 and an outlet 29 which are innerconnected by a cooling coil which is disposed within a housing 30 which is connected to the bottom wall 23 of the tray.

In order for the glass plate 21 to work as a collection surface for liquid condensate, the stand 11 is designed so that the front legs 12 are just slightly shorter than the rear legs 12'. Therefore, with the tray mounted to the upper portion of the stand, the unit will be inclined toward the front wall 18' along which the channel 24 is disposed.

In order to increase the amount of radiant energy which may be collected and utilized to distill liquid from the waste material W contained within the dryer unit, a pair of mirrors 32 are mounted along each end wall 19 of the tray. The mirrors may be selectively adjustable in order to concentrate the solar energy with respect to the interior surface of the tray. Further, although generally planar mirrors 32 are shown in the drawings, it is envisioned that mirrors of a different size and shape may be utilized in order to further increase the concentration of solar energy with respect to the tray.

In the operation of the single unit solar dryer of the present embodiment, a waste material W containing a mixture of fibrous materials and a solvent or waste chemical such as acetone is placed within the tray with the cover being removed therefrom. The level of the waste material should be below the upper edge of the condensing collection unit 16 which extends inwardly of the tray. After the waste material has been placed within the tray, the cover is tightly sealed by closing the clamps 20 thereby locking the glass cover in sealed relationship over the interior of the tray. As the waste content within the tray is heated by the sun, the more volatile acetone or other chemical component will be vaporized and will thereafter either be condensed directly within the condensing unit 16 into a liquid which is collected in the collection receptacle 14 or will rise as a vapor until it collects and condenses along the lower surface of the glass plate 21. Due to the slope on the glass plate caused by the stand 11, the condensate will have a tendency to travel along the glass plate toward the side wall 18 of the dryer where it will be collected in the trough 24. The fluid condensate will thereafter flow through channel 26 into the collection pipe 27 which communicates the trough 26 with the collection receptacle 14.

The waste material within the tray is retained until a hardened residue is formed therein. Such residue is in a very dry state having substantially all of the solvent or chemical material evaporated therefrom so that the residue once removed from the container may be handled as a conventional waste product and disposed of as a non-toxic and non-hazardous material. The acetone or other solvent which has been collected in a purified state is retained within the receptacle 14 and may be drained therefrom through the drain 15 into other receptacles for future use.

During the normal operation of the solar dryer 10, varying amounts of cooling water may be provided through the cooling coils within the condenser 16 dependent upon the temperature being achieved within the solar dryer tray. Also, due to the heat absorbing capabilities of the tray, condensate will continue to be collected even after periods of sunlight due to the heat differential between the glass cover 21 and the interior of the tray. As the glass cover cools during hours of darkness, a temperature differential is established which continues to promote the condensation of the solvent materials from the waste products.

With regard to the embodiment of the invention shown in FIGS. 3–6, a commercial system for handling bulk quantities of waste in a generally continuous process is disclosed. The system shown in FIGS. 3–6 is designed to meet government regulations with regard to the containment of hazardous and toxic waste materials and to provide an environmentally safe processing plant which can be utilized or installed in almost any location without fear of contamination to local ground waters or environment.

Figure 3:
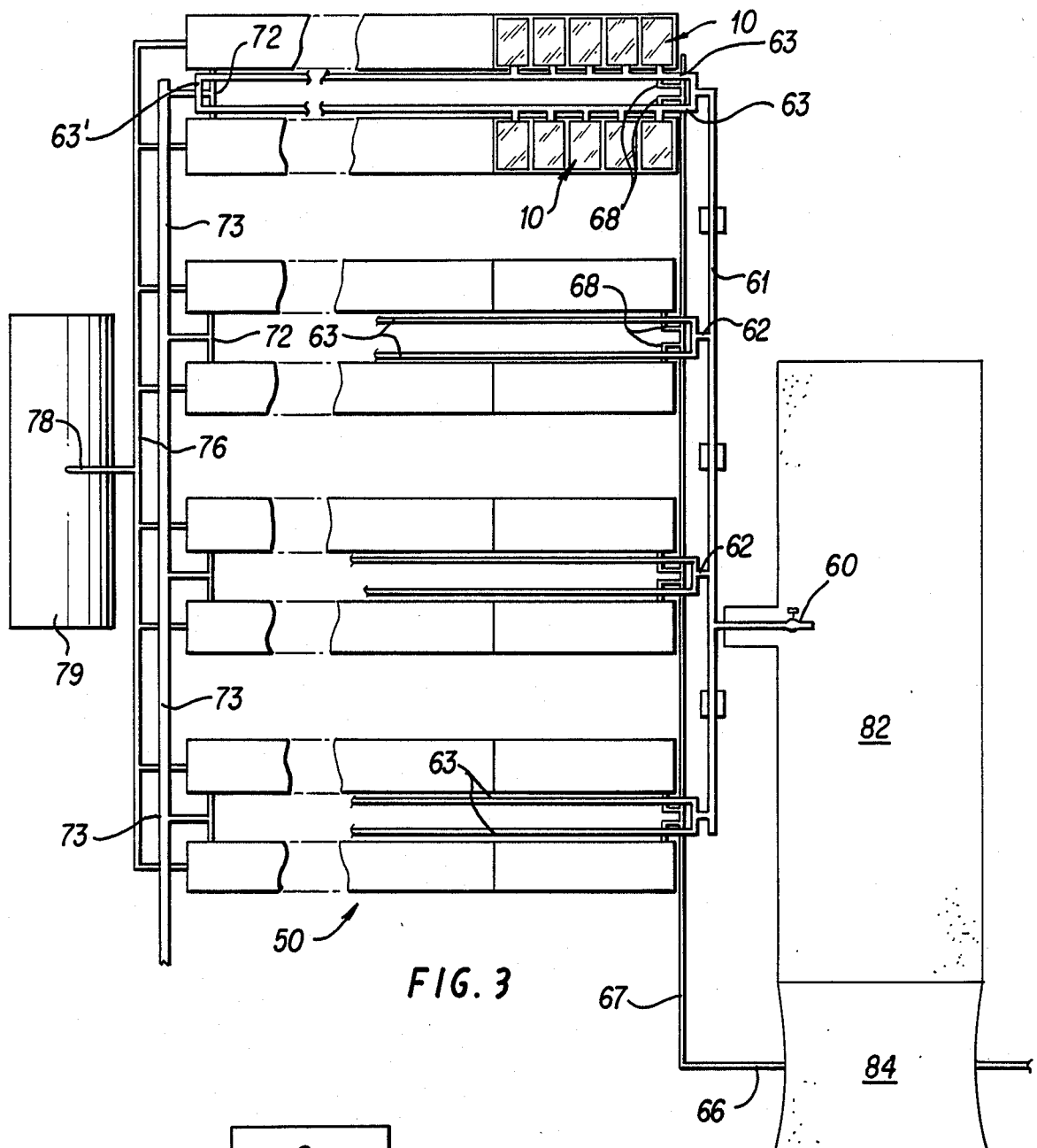
FIG. 3 is an illustrational top plan view of a treatment facility utilizing a plurality of dryer units mounted within containment supports and connected for use as a system in accordance with the teachings of the present invention.
Figure 5:
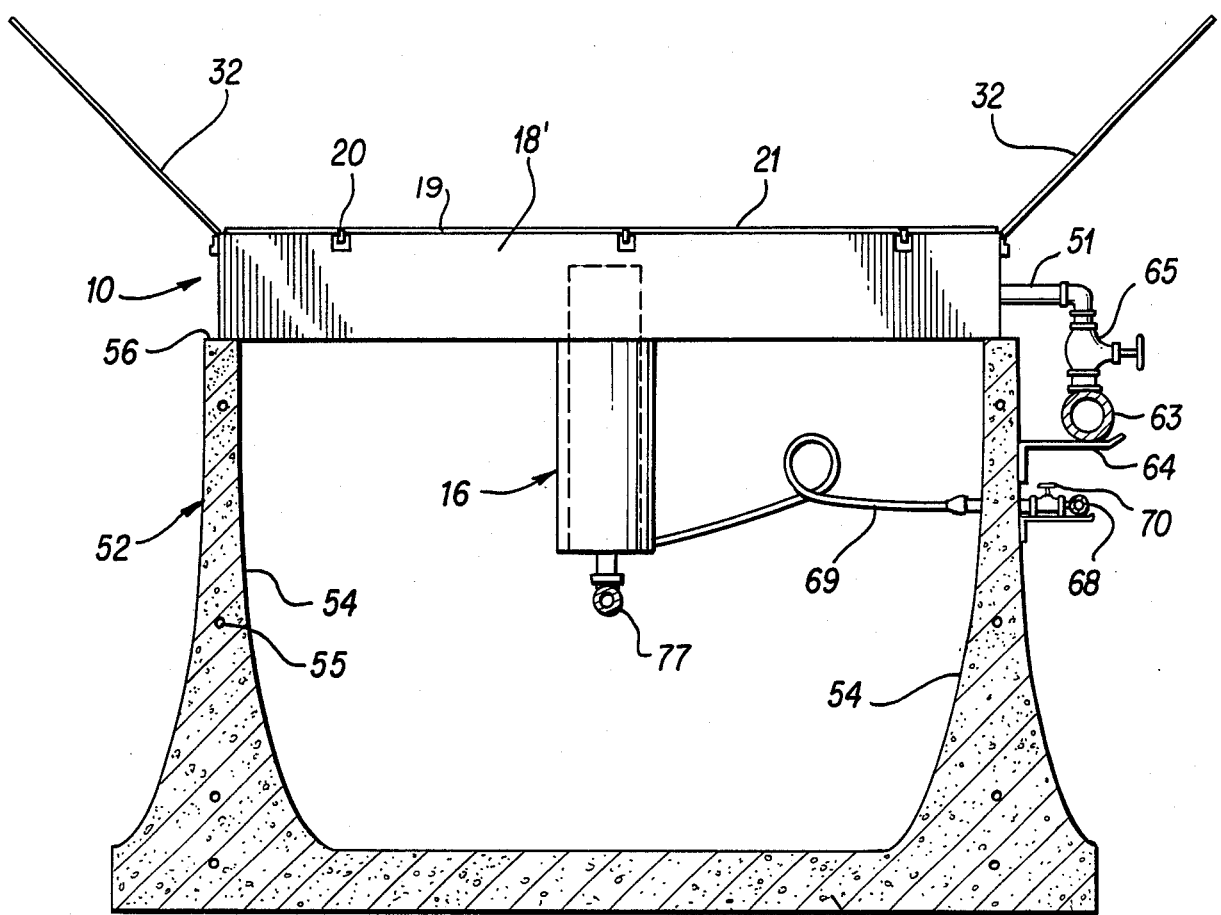
FIG. 5 is an enlarged cross sectional view taken along lines 5—5 of FIG. 3 and illustrating the relationship between the solar dryer trays and the containment facilities.

The solar drying system 50 as shown in top plan in FIG. 3 utilizes a plurality of solar dryers 10 which are connected with one another in an in-line system which may be expanded as necessary. The solar dryers 10 used in the system are generally identical to that described in FIGS. 1 and 2 with the exception that each of the dryers is provided with an inlet 51 for receiving waste materials as will herein be described in greater detail. The waste inlet 51 extends through one of the end walls 19 of the solar dryers 10 as shown in FIG. 5.

Figure 6:
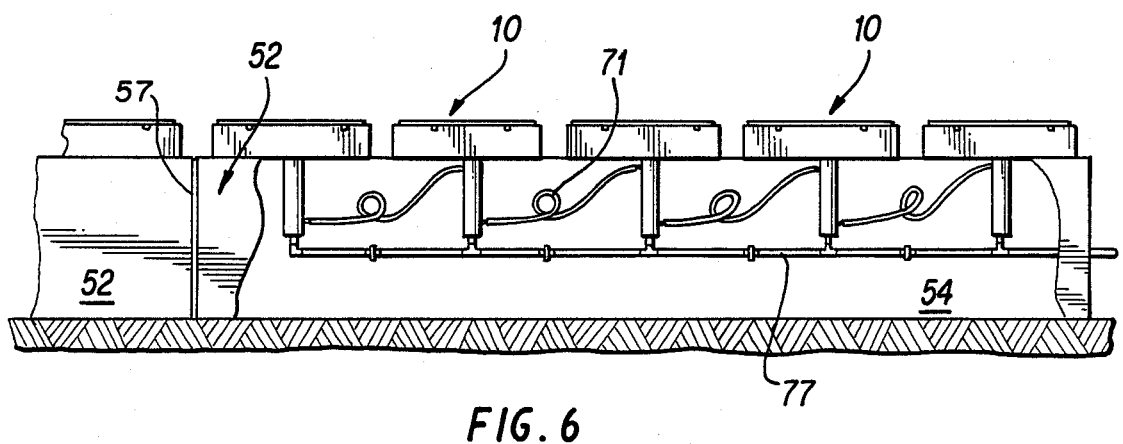
FIG. 6 is a side elevational view having portions broken away showing a standard containment section having five solar dryer units incorporated therewith.

In order to provide an expandable processing system for the bulk handling of toxic or hazardous waste materials, a plurality of solar heaters 10 are designed to be supported on a concrete containment or base member 52 in such a manner that the base provides a containment area to trap any spills of toxic or hazardous chemicals which may accidentally leak from any one of the solar drying units. Each of the concrete base units 52 is generally U-shaped in cross section and includes a bottom pad 53 and a pair of vertically extending side walls 54. The side walls are reinforced by conventional reinforcing materials including steel bars shown at 55. The upper surface 56 of each of the side walls provides a mounting surface for receiving the ends 19 of each of the dryers 10. As shown in FIG. 6, a typical base unit 52 may have as many as five solar dryers 10 mounted thereon in equally spaced relationship with respect to one another.

Each of the base support members 52 are equal in length and are designed to be aligned in abutting relationship with respect to one another from end to end. After being positioned in proper end to end relationship, the joint between each of the base sections is sealed by a cementitious or other liquid impermeable barrier 57. The base units are left in open communication so that the interior portions thereof can be traversed from one to another without interference.

In order to provide a supply of waste effluent to each of the solar dryers, such waste materials are conveyed from a central intake valve 60 which is selectively connected to a vehicle for transporting waste materials. The waste effluent flows from the vehicle and enters a first or central header 61 having a plurality of secondary headers 62 branched therefrom. Each of the secondary headers is divided to provide first and second waste feed pipes 63 which extend along the side walls 54 of each of the containment bases 52. The feed pipes 63 are supported at spaced points by brackets 64 which are anchored by bolting to the side wall of the concrete bases.

As previously mentioned, the solar dryers 10 of the present embodiment have been modified to include a waste intake nipple shown at 51. Waste from the waste feed pipes 63 is conveyed to the intakes 51 by way of a valve and elbow arrangement 65. Each pair of feed pipes 63 are integrally joined at their downstream ends as shown at 63' so that a continuous circuit is maintained for the passage of waste feed materials. A central water line 66 is connected to an appropriate source of water under pressure and is distributed through a central header 67 which is connected to a plurality of water distribution lines 68 which extend into the interior of the first concrete base unit in a row of such units. The first dryer unit condenser 16 (FIG. 5) is connected by way of cool water inlet line 69 and through valve 70 to the distribution lines 68. After the cooling water passes through the first condenser unit 16, the water passes through a series of condenser coupling conduits 71 (FIG. 6). Discharge water thereafter flows from the last condenser unit in a line through outlet lines 72 to a common discharge water line 73 which extends along the ends of the containment bases.

In the embodiment of the invention shown in FIG. 1, a collection receptacle was mounted to receive fluid passing through the condenser unit or through the collection pipe 27 that extended through each of the condenser units. In the present embodiment, the distilled solvent is passed directly to a collection line 76 which extends through the interior and between the containment walls 54 from one end of a series of containment bases to the other. Fluid is collected in each condenser 16 and collection pipe 27 and directed through connectors 77 to the collection pipe 76. The collection pipes are each connected in turn to a common collection drain 78 which feeds the recaptured solvent to a awaiting storage tank 79.

In order to insure that the processed solvent is contained within the bases of the present invention, the end unit of each line of bases is sealed between the side walls 54 so that no fluid may pass from the interior thereof.

Figure 4:
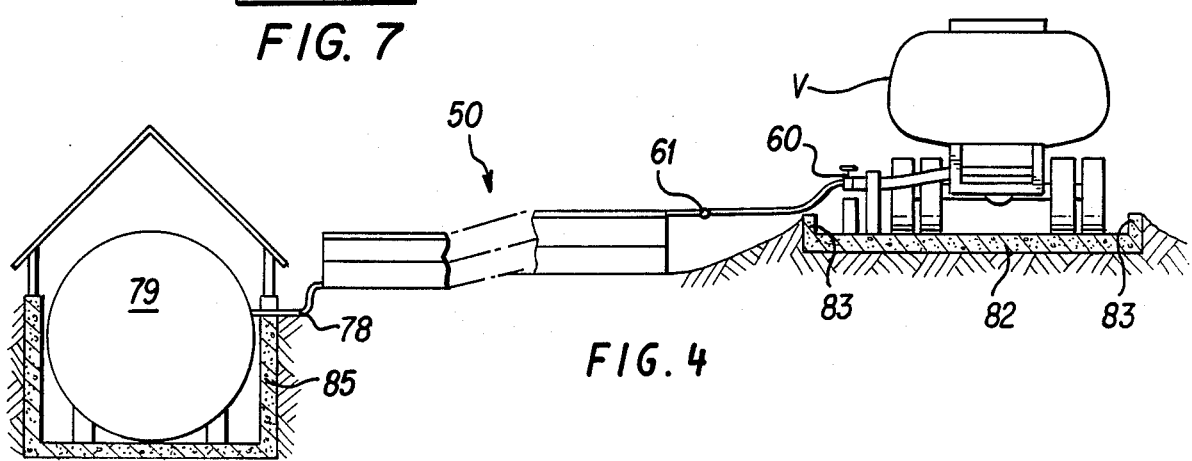
FIG. 4 is an illustrational view of the gravity field flow effect which is achieved utilizing the system of the present invention so as to eliminate the need for electrical pumping apparatus.

Each line of containment units and associated solar dryers are designed to be installed on a prepared sloping surface so that the longitudinal axis of each of the containment bases is oriented in a downhill orientation. In this manner, a continuous slope is developed from the first solar dryer to the last one in a particular series. Such an arrangement will allow the distribution of waste material, water and the collection of solvent to be accomplished by gravity flow. In FIG. 4, an illustrational view is shown wherein the vehicle V carrying the waste material is shown as being positioned uphill of the distribution system and of the solar dryer units which are themselves designed to be installed along the slope uphill or elevated with respect to the collection tank 79. The installation therefore not only allows the treatment of toxic wastes and such using solar energy but also provides a system for distributing the waste material, coolant supplies and collecting solvents without the need of further electrical energy.

With further reference to FIG. 3 of the drawings, the containment and processing facility of the present invention also provides containment for the source of supply of the waste material. In this respect, vehicles carrying the waste material are to be parked along an enlarged concrete containment pad 82 having upstanding side walls 83 and sloped entrance 84 so that in the event there is any spill within the transfer area adjacent the valve 60, such spillage will be retained within the concrete parking area thereby preventing the escape of any toxic material to the ground or ground water supply. In a like manner, the storage tank 79 for the purified recaptured solvent would also be housed within a six inch concrete bin 85 so as to insure, that in the event of any leakage within the tank, such leakage will be trapped within the concrete bin.

The solar dryers of the present invention can be utilized to reclaim solvents from waste materials wherein solvents can be withdrawn or distilled at temperatures of up to 100° C. It has been found that on extremely sunny days in areas such as the State of Florida that temperatures within the dryers are sufficient to boil water. Normally, the operating range of the stills would be between 10°–73° C., and therefore, it would be more effective for removing solvents having a boiling point in that range. The boiling point of acetone, for instance, is approximately 56° C. However, using magnified or other auxiliary reflectors, the temperature within the dryers may be increased.

The process of the present invention is particularly cost effective in recycling waste materials wherein a single solvent may be removed by distillation leaving behind solid fibers or other solid waste material so that no fractionating of solvents is necessary. Examples of such waste products which are classified as toxic and hazardous are acetone byproducts from cleaners, thinners and additives used in various manufacturing areas. Acetone is frequently used where fiberglass is present in a manufacturing process such as in boat building, swimming pool manufacturing and the like. Further, industries that utilize epoxy resins to fabricate products normally utilize acetone for a cleansing agent and thinner. All these industrial uses, which are only an example, generate tremendous quantities of toxic and hazardous waste material which must be specially handled in order to protect the environment. The waste generally consists of acetone mixed with waste fibers, dirt particles, resins and the like.

Utilizing the process of the present invention, waste products such as mixtures of acetone with various materials are initially shipped to the processing site by tank trucks. After the truck is parked on the containment slab, the waste feed line is connected through the valve 60 to begin receiving the waste effluent. The present system is designed to operate solely by gravity, and therefore, the concrete pad is designed to be elevated with respect to the waste line distribution system and to all the solar dryers which are mounted in the system. The waste line directs the waste material to each of the solar dryers wherein the valves 65 may be opened to permit a quantity of waste material to enter each of the trays 17 of the solar drying units. When an appropriate amount of waste material has entered the tray, an operator closes the valve 65 and proceeds with opening the next adjacent downstream valve to fill the next adjacent solar dryer. The mixture of acetone and fibers are then separated by a distillation process involving solar energy and evaporative cooling using the condenser coils in the condensing unit 16. During normal operations, it has been found that approximately 20–30% of the solvent acetone is recovered by way of the condenser unit 16 with 70–80% of the acetone being recovered as condensate which collects along the glass covers of each of the solar dryers.

The liquid condensate either from the condensing unit 16 or that which is conveyed through the troughs of each of the solar dryers to the discharge pipes 27 are all conveyed to the clean solvent return line 77 which is contained between the walls of the containment base members 52. In southern environments or areas such as in the State of Florida, on an average day with temperatures ranging in the upper 70's to upper 80's F., it has been found that each of the solar dryers can be filled with waste materials every day for a period of approximately two weeks. The bulk of the acetone will boil off on a; daily basis with portions thereof being boiled off or condensed during the hours after sunlight as previously discussed. After a two week period of daily use, each solar dryer is allowed to retain the residue deposited therein for an additional two days until such residue is thoroughly dried and hardened. Therefore, the process of the present invention permits second or additional quantities of waste materials to be introduced into the trays of the solar dryers after a substantial amount of the solvent has been evaporated from an initial or previous quantity of waste material. This additional processing will prevent the complete drying of the residue until the resultant residue is allowed to be dried for an extended period of time. Thereafter, the glass covers are removed from the trays 17 and the residue scraped from each of the trays.

Figure 7:
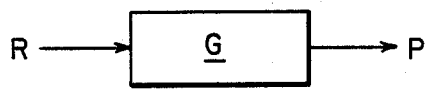
FIG. 7 is a block diagram schematically illustrating the flow of the hardened residue from the solar dryers to a grinder to form a reusable product.

As the residue has been subjected to additional periods of drying time, substantially all of the toxic solvent or acetone has been removed therefrom. In the operation of a test facility utilizing the apparatus and method of the present invention, the residue was taken to independent testing laboratories where the residue was determined to be of a quality where it could be disposed of as if conventional waste material and thus safe for disposal in conventional landfills. However, an added benefit of the present process is that the material or residue which is deposited can also be recycled for industrial use. In this respect, after the acetone has been removed from waste materials containing resins and fiberglass, the hardened residue R can be ground in a conventional grinder G to a fine product P (as shown schematically in FIG. 7) which can thereafter be used as a resin material or filler material in the same industries from which the waste material was initially received Therefore, the resultant byproducts of the process are totally reusable solvents which are in a purified state and which may be used in industry as well as filler materials which may also be used in industry with no waste products remaining.

In those instances where a waste product may be combined with small amounts of oil such as where acetone is used as a cleaning solvent, the oil will not fractionate during the process of the present invention but will settle to the bottom of the trays where such oil may be withdrawn through the outlet valves (not shown) which may be positioned in the bottom of each solar dryer tray. Each of the outlet valves may be connected to a common discharge pipe, not shown, through which the oil may be conveyed to appropriate storage containers.

The process of the present invention is not limited to the recycling of acetone type waste products but may be utilized on a plurality of industrial hazardous or toxic waste materials containing a solvent or other chemical which can be boiled off leaving a residue of hardened material. The system may also be used to separate even more toxic materials which are contained in a solution such as mixtures of PCB's and acetone. As an example, acetone could be utilized to clean PCB transformers where the acetone can be utilized to concentrate the PCB from the cleaning solution. In such a process, a transformer would be flushed with an initial charge of acetone in order to receive PCB's. This waste material would thereafter be introduced into the solar dryers of the present invention with the acetone being recaptured at a lower temperature level than the PCB's. Substantially, all of the acetone would be removed by solar energy utilizing such a process which would mean a net reduction in the use of the conventional kerosene solvents which are currently being used to treat or clean PCB transformers. The foregoing is just one example of the type of alternate chemical processing that can be accomplished using the apparatus and method of the present invention. Other examples of industrial wastes which may be processed by the present invention are those wherein a halogenated hydrocarbon such as known under the trademark FREON is contained in dry cleaning waste solutions or those in which a trichloro-ethane such as 1-1 trichloro-ethane is utilized and recovered as a waste product in the printed circuit board industry. Other solvents include alcohols, ethanes, ketones, glycols, amines and the like.

The capacity of processing utilizing the solar dryers of the present invention will, of course, depend upon the various waste materials which are introduced into the system. Utilizing the above example with regard to acetone waste, it has been found that five or more gallons a day of acetone waste can be processed in each of the solar dryers at the average temperature referenced above. With a system established with forty stills, the average flow rate would be approximately 200 gallons a days of purified recovered acetone. Again, the recovery is made without the introduction of any commercial energy thereby significantly reducing the cost of the entire operation.

The concrete containment units of the present invention have been designed to be handled by conventional small front end loader or forklift and are approximately 18 feet in length. Each base is normally mounted on a slope which drops approximately 2 feet in every 150 feet in order to obtain desired gravity flow from one set of solar dryers to the next set. In operation, the solar dryers are generally limited in size to 3'×4'. This size may be varied, however, the glass which covers each of the solar dryers must be strong enough to withstand the pressures created by the changes in temperature which accompany the use of the system. It has generally been found that larger sheets of glass will not satisfactorily withstand the pressures which are developed in the system.

I claim:

1. An apparatus for drying toxic industrial wastes containing mixtures of distillable liquid solvents and solid matter by utilizing solar energy comprising a tray means, said tray means having side and bottom walls which define an interior waste material receiving compartment, transparent cover means secured to said side walls so as to be in spaced relationship to said bottom wall, a condenser means disposed through said bottom wall of said tray means so as to be in open communication with said interior compartment, trough means within said tray means for receiving condensate from said transparent cover means, channel means extending from said trough means to said condenser means, said condenser means having a collection conduit extending therethrough, said collection conduit receiving the condensate from said channel means and said interior compartment of said tray means, receptacle means for receiving condensate from said collection conduit, and base means for supporting said tray means at an incline whereby condensate collecting on said cover means will be caused to flow toward said trough means.

2. The apparatus of claim 1 including at least one reflector means carried by said tray means, said reflector means being selectively adjustable so as to direct solar radiation into said interior waste receiving compartment.

3. The apparatus of claim 2 including a plurality of latch means for removably securing said cover means to said side walls of said tray means.

4. The apparatus of claim 3 in which said receptacle means is mounted to said bottom wall of said tray means in encircling relationship with said condenser means, and discharge means extending from said receptacle means.

5. An apparatus for drying toxic industrial wastes containing mixtures of distillable liquid solvents and solid matter by utilizing solar energy comprising a plurality of dryer tray means, each of said tray means having side and bottom walls which define an interior waste material receiving compartment, transparent cover means secured to said side walls so as to be in spaced relationship to said bottom wall, a condenser means disposed through said bottom wall of each said tray means so as to be in open communication with said interior compartment, trough means within each of said tray means for receiving condensate form said transparent cover means, channel means extending from each of said trough means to said condenser means, collection means within each of said condenser means for collecting the condensate from said channel means and the interior compartment of said tray means, base means for supporting each of said tray means at an incline whereby condensate collecting on each of said cover means will be caused to flow toward each of said through means, each of said tray means having a waste material inlet, first conduit means for supplying said waste material to said waste material inlets, second conduit means, communicating with said collection means of said trays for recovering condensate therefrom, storage means for the condensate, and said second conduit means being connected with said storage means.

6. The apparatus of claim 5 in which each of said condenser means includes a cooling water inlet and a cooling water outlet which are connected within each condenser means by a heat exchange coil, third conduit means for supplying cooling water to each of said condenser means.

7. The apparatus of claim 6 in which said base means includes at least one containment member having spaced upstanding side walls and a bottom wall which define an elongated opening therebetween, said side and bottom walls of said containment member being generally impervious to the passage of fluid therethrough, said tray means being mounted in spaced relationship on said upstanding side walls of said containment member so that said condenser means are suspended between said upstanding side walls.

8. The apparatus of claim 7 in which said containment member is mounted on a sloping surface so that each of said tray means is inclined relative to one another along the length of said containment member.

9. The apparatus of claim 8 including at least one reflector means mounted to each of said tray means for reflecting solar radiation inwardly into said interior compartment of said tray means.

10. The apparatus of claim 9 in which said second conduit means extend intermediate said side walls of said containment member.

11. A treatment facility for processing industrial toxic and hazardous waste materials which include mixtures of distillable solvents and solid matter and in which the facility operates on solar power and in which the waste material is transported by a vehicle to the facility comprising a plurality of solar dryers which are oriented between a vehicle containment pad and a solvent recovery tank, each of said solar dryers having a condenser means for condensing liquid, each of said solar dryers being mounted on containment base members having upstanding side walls and a bottom wall and first and second end portions, said base members being oriented so that said first end portions are inclined upwardly with respect to said second end portions so that said solar dryers are inclined relative to one another, said vehicle containment pad being elevated with respect to said containment base members and said solvent recovery tank being generally below said solar dryers, a first conduit means for conveying waste material from the vehicle containment pad to said solar dryers by gravity flow, each of said solar dryers having condensed liquid discharge means, second conduit means extending between each of said condensed liquid discharge means and said solvent recovery tank, and valve means along said first conduit means for cycling the flow of waste material to each of said solar dryers whereby waste material is conveyed to and condensed solvent discharged from said solar dryers by gravity.

12. The treatment facility of claim 11 including third conduit means for supplying cooling water to each of said condenser means.

* * * * *